United States Patent
Johnson et al.

(10) Patent No.: US 9,262,749 B2
(45) Date of Patent: Feb. 16, 2016

(54) SYSTEM AND METHOD FOR GENERATING PERMIT REPORTS

(75) Inventors: Josiah Johnson, Somerville, NJ (US); Cory Marchasin, Lambertville, NJ (US); Chad Collins, Warwick, PA (US); Avinash Sridhar, Cranbury, NJ (US); Gad Moshe Berger, Dayton, NJ (US)

(73) Assignee: IPT LLC, Somerville, NJ (US)

( * ) Notice: Subject to any disclaimer, the term of this patent is extended or adjusted under 35 U.S.C. 154(b) by 219 days.

(21) Appl. No.: 13/458,983

(22) Filed: Apr. 27, 2012

(65) Prior Publication Data

US 2012/0209667 A1    Aug. 16, 2012

Related U.S. Application Data

(63) Continuation-in-part of application No. 11/281,841, filed on Nov. 16, 2005, now Pat. No. 8,219,442.

(51) Int. Cl.

| | |
|---|---|
| *G07B 15/00* | (2011.01) |
| *G08G 1/14* | (2006.01) |
| *G06Q 50/30* | (2012.01) |
| *G06Q 10/10* | (2012.01) |
| *G06Q 50/26* | (2012.01) |
| *G07B 15/02* | (2011.01) |

(52) U.S. Cl.
CPC .............. *G06Q 10/103* (2013.01); *G06Q 50/26* (2013.01); *G07B 15/02* (2013.01)

(58) Field of Classification Search
CPC ....................................................... G07B 15/00
USPC ........................................... 705/13, 7.11, 1.1
See application file for complete search history.

(56) References Cited

U.S. PATENT DOCUMENTS

| | | | |
|---|---|---|---|
| RE38,626 E | 10/2004 | Kielland | |
| 7,104,447 B1 | 9/2006 | Lopez et al. | |
| 7,950,570 B2 | 5/2011 | Marchasin et al. | |
| 8,063,797 B1 | 11/2011 | Sonnabend et al. | |
| 2005/0125284 A1 | 6/2005 | Fairbaugh | |
| 2005/0280555 A1 | 12/2005 | Warner, IV | |
| 2006/0255119 A1* | 11/2006 | Marchasin ............ | B60R 25/093 235/375 |
| 2007/0085704 A1 | 4/2007 | Long | |
| 2007/0094069 A1 | 4/2007 | Berman | |
| 2007/0112620 A1 | 5/2007 | Johnson et al. | |
| 2007/0267479 A1 | 11/2007 | Nix et al. | |
| 2008/0021770 A1 | 1/2008 | Mourton et al. | |
| 2008/0265016 A1 | 10/2008 | Fitzgerald et al. | |

(Continued)

FOREIGN PATENT DOCUMENTS

EP    1229504 A1    8/2002

OTHER PUBLICATIONS

International Search Report for International Application No. PCT/US2013/038125, rendered Aug. 2, 2013, by the International Searching Authority ("ISA"), 1 (one) page.

(Continued)

*Primary Examiner* — Akiba Allen

(57) ABSTRACT

A computer-implemented method for generating parking permits reports for a parking permit system. The method includes aggregating parking permit data for each zone within the parking permit system into a logical grouping in a database. Then processing data according to report generation instructions. The data is then parsed to obtain a requested report and the report is distributed to a specified party.

20 Claims, 9 Drawing Sheets

(56) References Cited

U.S. PATENT DOCUMENTS

| | | |
|---|---|---|
| 2008/0270217 A1 | 10/2008 | Spittel et al. |
| 2008/0319837 A1 | 12/2008 | Mitschele |
| 2009/0099954 A1 | 4/2009 | Kilby |
| 2009/0227240 A1 | 9/2009 | Sheets |
| 2011/0055091 A1 | 3/2011 | Budlong |
| 2011/0099126 A1* | 4/2011 | Belani .................. G08G 1/14 705/418 |
| 2011/0210827 A1 | 9/2011 | Lidror |
| 2012/0095812 A1 | 4/2012 | Stefik et al. |
| 2012/0245981 A1* | 9/2012 | Volz ............................... 705/13 |
| 2013/0117079 A1 | 5/2013 | Ioli |

OTHER PUBLICATIONS

International Search Report for International Application No. PCT/US2013/038121, rendered Aug. 9, 2013, by the International Searching Authority ("ISA"), 1 (one) page.

International Search Report for International Application No. PCT/US13/37963, rendered Jul. 22, 2013, by the International Searching Authority ("ISA"), 1 (one) page.

* cited by examiner

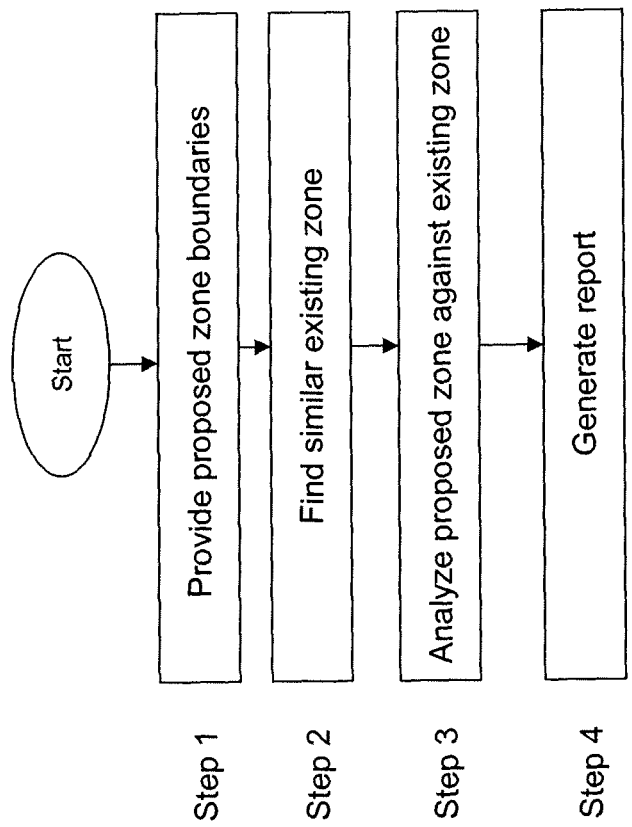

SYSTEM AND METHOD FOR GENERATING PERMIT REPORTS

CROSS REFERENCE TO RELATED APPLICATION

This application is a continuation in part of co-pending U.S. patent application Ser. No. 11/281,841 entitled "Permit-Based Parking Environment Management Method and System" filed on Nov. 16, 2005, hereby incorporated by reference.

BACKGROUND

Publicly and privately administered parking programs continually struggle with the seemingly intractable problem of providing parking services for an area having a limited number of parking spaces to an ever increasing number of vehicles. To combat this struggle, there is an increasing effort to manage parking in residential and business communities. That is, cities, towns, universities and large corporations are attempting to set up parking programs that provide local residents, students and employees with a place to park. This effort generally involves the use of permit-based parking programs but the challenges faced when implementing these systems are great.

For background, most permit-based parking programs restrict parking privileges in an attempt to assure residents that they are able to find a place to park. The goal of such programs is to encourage persons to obtain a permit for parking privileges, or, alternatively, move non-permit holder vehicles, to metered, time-limited, or garage parking.

However, such programs are very difficult and expensive to implement and manage. Inefficiencies in the administration of these parking programs and a lack of enforcement of the regulations are rampant problems facing today's parking programs, leading to a significant dilution in the intended benefits.

For example, a municipality that institutes a permit-based parking program may face the task of issuing from 20,000 to 500,000 permits per year, which requires a complete overhaul of the municipality's existing parking regulation enforcement plan. Also, enforcement in areas designated for parking by permit-only is difficult since parking enforcement officers need to locate and validate every parking permit they encounter. This is especially difficult and sometimes even dangerous if the parking permits are for parking overnight.

Another problem encountered is that permit-based parking programs inherently require a paper intensive application and validation process. Often times, the applicant is required to prove that they are the owner of the vehicle they are requesting the parking permit for, and that they live or work in the parking zone in which they would like to park. In addition, there may also be other requirements that the applicant must adhere to such ensuring that there are no other outstanding obligations to the municipality or university.

The conventional verification process generally requires an applicant to prove, in person, the information needed for issuing the permit since scanned, faxed, or emailed documents can be easily forged. This wastes a considerable amount of time for both the permit holder and the issuing agency.

Anther problem is that while the issuance of permits assists in the institution of parking regulations, use of conventional permits includes many disadvantages. For example, a conventional parking system may designate a parking zone within the parking system with a unique parking permit design and color. These designs and colors may change from month to month, or year to year depending on the permit expiration dates. The reason these permits are different in each zone is to make it easier for the parking enforcement officers to determine the parking eligibility of the vehicle. However, managing the inventory of physical permits for each different color and design scheme presents additional challenges and costs.

Also since conventional permits are typically embodied as a sticker that either affixes to a window of the vehicle or a hang-tag that hangs within the vehicle (e.g., from the rear view mirror), it is often difficult to determine if a permit is present based on a visual inspection of the vehicle, due to a variety of factors including the presence of tinted windows and/or the arrangement of the vehicle (e.g., angled parking). This creates a significant burden on the individual responsible for inspecting vehicle to determine if the vehicle is legally parked who must locate and read the permit via a visual inspection of the vehicle.

In addition, conventional permits are frequently stolen or "scalped" (i.e., sold by the authorized permit holder to an unauthorized person). With no efficient means to track the permits administered under a parking program, such misuse is extremely difficult to detect and terminate. Additionally, even properly issued permits may be misused and sometimes the parking permits themselves are often forged in an effort to trick parking enforcement officers and get free parking.

Finally, while some municipalities and most universities charge a fee parking permits, others distribute parking permits at no cost to the applicants. When these entities try in increase the cost of the permits or initiate a cost for parking permits, this is often met by resistance by the public. This resistance is generally due the fact that information about how and why parking permit programs are necessary and the results thereof are not shared in a digestible format to the public, or not shared at all. This leaves the public to believe that parking permits may have little or no monetary value because the entity has no way to prove the value of the parking permit program it administers.

Accordingly, there is a need in the industry for a method and system to streamline the permits application, validation, and registration process, eliminate the need for physical permits, make enforcement of parking permit violation more efficient, and provide a way where information about the parking permit program is shared amongst the program administrator and general public.

Furthermore, there is a need for a motorist to be able apply and have their information validated quickly without the need to apply in person.

Further, there is a need for the parking permit administrators to have way to distribute parking permits that will eliminate the need to manage an inventory of physical permits and virtually eliminate the possibility of permit fraud.

Further, there is a need for parking enforcement to be quicker, more efficient, and safe.

SUMMARY OF THE DISCLOSED TECHNOLOGY

The disclosed technology relates a parking permit system that is capable of generating permit reports.

One aspect of the disclosed technology is directed towards a computer-implemented method for generating parking permit reports for a parking permit system. The method includes aggregating parking permit data for each zone within the parking permit system into a logical grouping in a database. Then processing data according to report generation instructions. The data is then parsed to obtain a requested report and then the report is distributed to a specified party.

One report related to identifying repeat violators and determining if the repeat violators are eligible for a parking permit within the particular zone. If so, the repeat violators are notified about availability and cost for a permit within the particular zone. Another report may determine if zone boundaries for the particular zone are adequate for permits within the particular zone and, if so, a report is created to visualize the determination.

Another report may determine rules changes within the parking zone and notifying permit holders of the rule change. And still another may determine which permits are set to expire within a period of time and notify permit holders that permits are set to expire.

The method may also present the parking permit data in a usable format so that new permit zones may be created based on the parking permit data. For example, the method may include a step for providing a proposed boundary for a new zone, analyzing the new zone and comparing the proposed zone to existing zones. Once completed a report showing feasibility of the proposed zone may be created.

The method may also present the parking permit data in a usable format so that advantages and disadvantages of program can easily be seen. For example, the method may analyze the parking permit data for program advantages and disadvantages and notifying permit holders and/or governing entities of the advantages and disadvantages.

Another aspect of the disclosed technology relates to a system for generating permit report. The system may include one or more processors and one or more computer-readable storage mediums containing instructions configured to cause the one or more processors to perform operations. The system includes aggregating parking permit data for each zone within the parking permit system into a logical grouping in a database. Then processing data according to report generation instructions. The data is then parsed to obtain a requested report and then the report is distributed to a specified party.

One report related to identifying repeat violators and determining if the repeat violators are eligible for a parking permit within the particular zone. If so, the repeat violators are notified about availability and cost for a permit within the particular zone. Another report may determine if zone boundaries for the particular zone are adequate for permits within the particular zone and, if so, a report is created to visualize the determination.

Another report may determine rules changes within the parking zone and notifying permit holders of the rule change. And still another may determine which permits are set to expire within a period of time and notify permit holders that permits are set to expire.

The method may also present the parking permit data in a usable format so that new permit zones may be created based on the parking permit data. For example, the method may include a step for providing a proposed boundary for a new zone, analyzing the new zone and comparing the proposed zone to existing zones. Once completed a report showing feasibility of the proposed zone may be created.

The method may also present the parking permit data in a usable format so that advantages and disadvantages of program can easily be seen. For example, the method may analyze the parking permit data for program advantages and disadvantages and notifying permit holders and/or governing entities of the advantages and disadvantages.

BRIEF DESCRIPTION OF THE DRAWINGS

FIG. 9 is a flow chart for a report generator process for the disclosed technology.

DETAILED DESCRIPTION

The disclosed technology relates to a parking permit system that issues, manages and enforces parking permits within a parking environment. A parking permit environment may include one or more parking areas or zones that are controlled by a parking program, e.g., parking lots, streets, garages, parking structures or anywhere vehicles may reside. The parking program may include a set of rules and regulations that govern parking in the zones of the disclosed technology.

Figure 1:
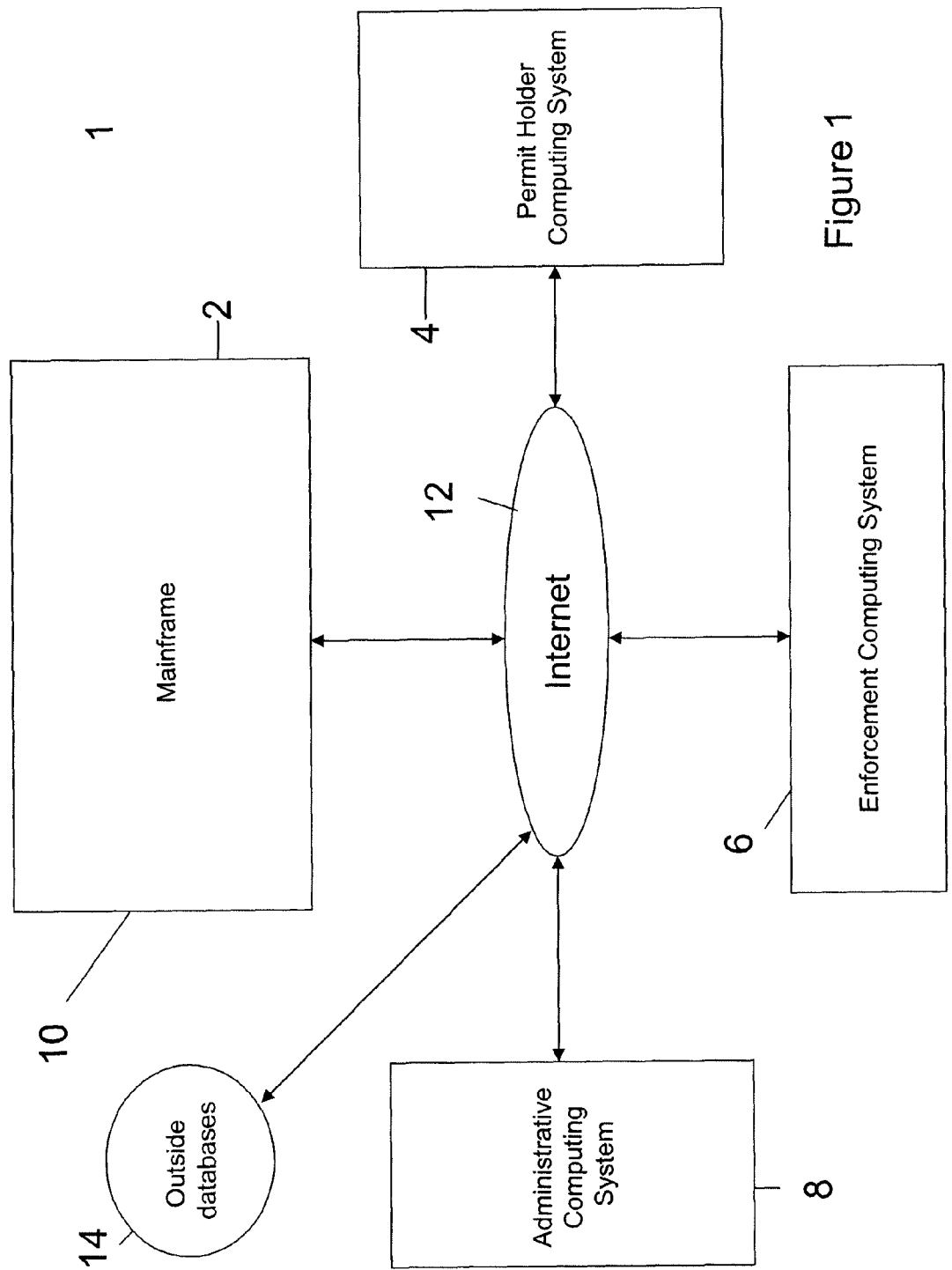
FIG. 1 is a block diagram showing the system of the disclosed technology.

FIG. 1 shows an example of a parking permit system. The permit parking system 1 includes, but is not limited to, a parking permit mainframe 2, a permit holder computer system 4, an enforcement computing system 6, and an administrative computing system 8. Each of these computing systems are communicatively connected to each other through the internet 12 via a web browser. The web browser provides a portal to one or more computing systems using a network connection, for example, a Network/Internet 100. One having ordinary skill in the art will appreciate that any web browser is suitable for use in the present invention, including but not limited to FireFox, Microsoft Internet Explorer, Netscape, Opera, and Mozilla.

Figure 2:
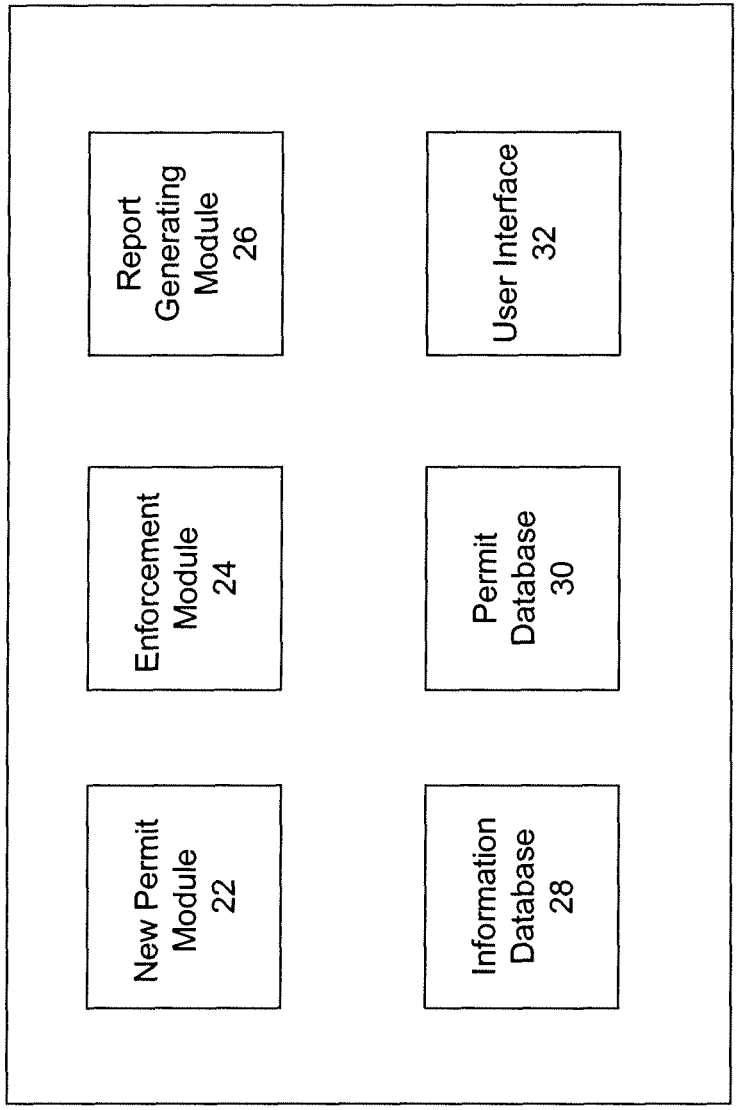
FIG. 2 is a block diagram showing the mainframe for the disclosed technology.

As shown in FIG. 2, the parking permit mainframe 2 includes, but is not limited to, a new permit module 22, an enforcement module 24, a report generator module 26, an entity database 28, a permit database 30 and a user interface 32.

The user interface 32 allows potential and existing permit holders to access the parking permit mainframe 2 via the permit holder computing system 4 for a variety of reasons, e.g., applying for a new permit, editing an existing account, making payments for a permit. The permit holder computing system 4 can be any web-capable device such as a home computer, laptop, tablet or smartphone.

The user interface 32 also allows system administrators to access the system 1 via the administrative computing system 8 for management purposes. The administrative system 8 can be any type of corporate network environment allowing many employees to access the system as needed.

The user interface 32 may include an authentication or login screen which prompts existing permit holders and administrators to provide login information (e.g., a username and password). One having ordinary skill in the art will appreciate that any suitable authentication system or method may be used in accordance with the present invention.

Once properly logged in, a permit holder may access information related to his or her account, and perform a number of account-related tasks, including, but not limited to the following: 1) add/edit/delete/update vehicle data; 2) add/edit/delete/ update permit data; 3) add/edit/delete/update permit holder data; 4) make bill, renewal, and/or citation payments; and 5) review account information including previously issued warnings/notices and/or citations; etc.

The administrative computing system 8 allows administrators to access the system for management purposes, including, but not limited to: 1) setting up and administering new parking programs; 2) providing online support; 3) managing user groups; 4) setting parking privilege data in accordance with the parameters of the parking program; 5) managing permit inventory; 6) processing new permit applications; 7) managing warning/notice and citation issuance; 8) defining and providing reports to the user groups; and 9) management of billing and invoicing processes.

Figure 3:
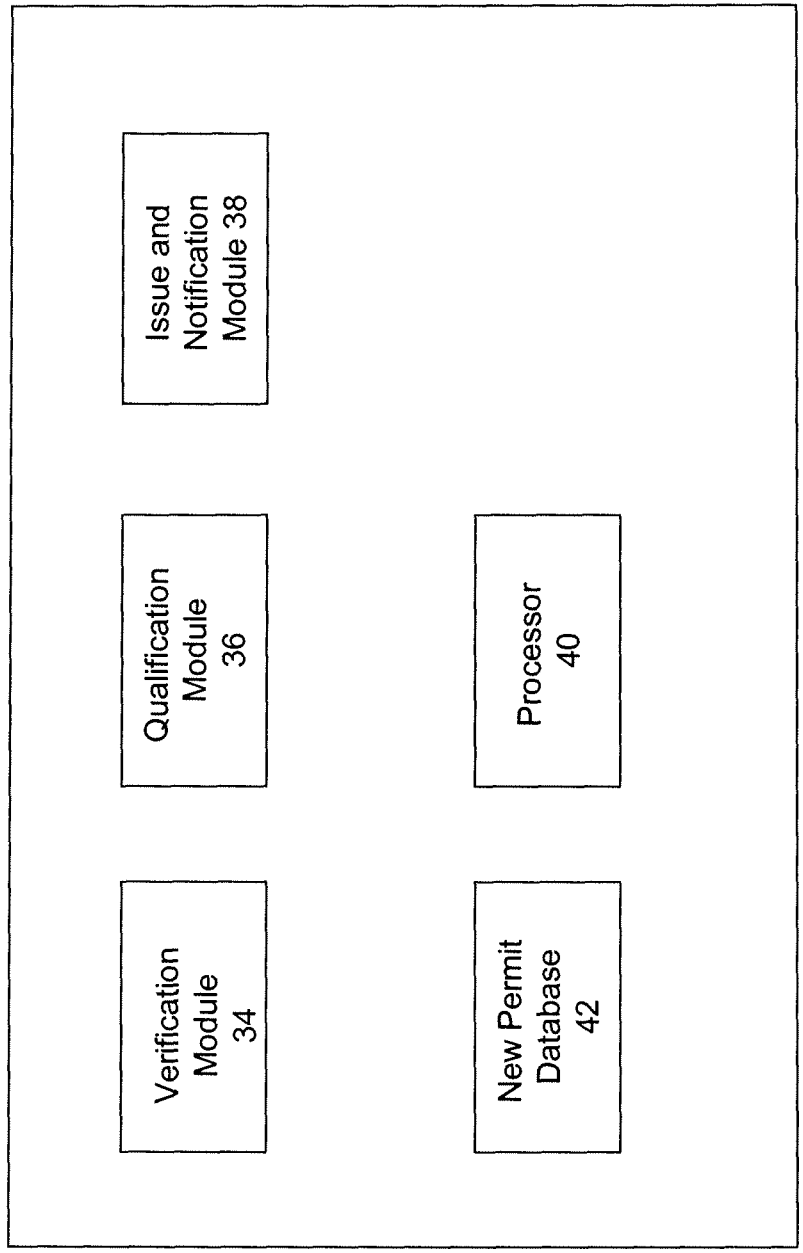
FIG. 3 is a block diagram showing new permit module for the disclosed technology.

The user interface 32 may also allow a potential or existing permit holder via the permit holder computing system 4 to access the new permits module 22 to submit a new permit application. As shown in FIG. 3, the new permits module 22 includes, but is not limited to, a verification module 34, a qualification module 36, an issue and notification module 38, a processor 40 and database 42.

The new permits module 22 provides an auto-verification method for processing parking permit applications. As will be discussed more fully below, the auto-verification works by using information provided in a parking permit application and electronically verifying a vehicle's motor registration information, residency of an individual or vehicle owner, enrollment status of a student, and/or other information provided by an applicant as required. The auto-verification system will determine if the vehicle(s) provided by the applicant have qualified for a parking permit, and/or the applicant has permission to park in a specific parking space, district, area, or zone for a period of time.

Once auto-verified, the vehicle's license plate will be used as the parking permit which will eliminate the need for a sticker, hang-tag, or decal to be distributed to the applicant by mail or in person. Enforcement and verification of parked vehicles will be based on the vehicle's license plate number. Enforcement tactics may include issuing a parking ticket, booting the vehicle, or towing the vehicle.

When a potential or existing permit holder interfaces with the new permit module 22, the potential or existing permit holder may be asked to complete a standardized permit application. These form applications may be stored within database 42. The new permit application may request data such as permit holder data, vehicle or vehicles to be associated with a permit, a license plate number of vehicle, a scope of privileges requested by the applicant, and a means for payment. It is worthy to note that the applicant need not submit proof required for issuance of the permit as will be discussed more fully below.

Figure 4:
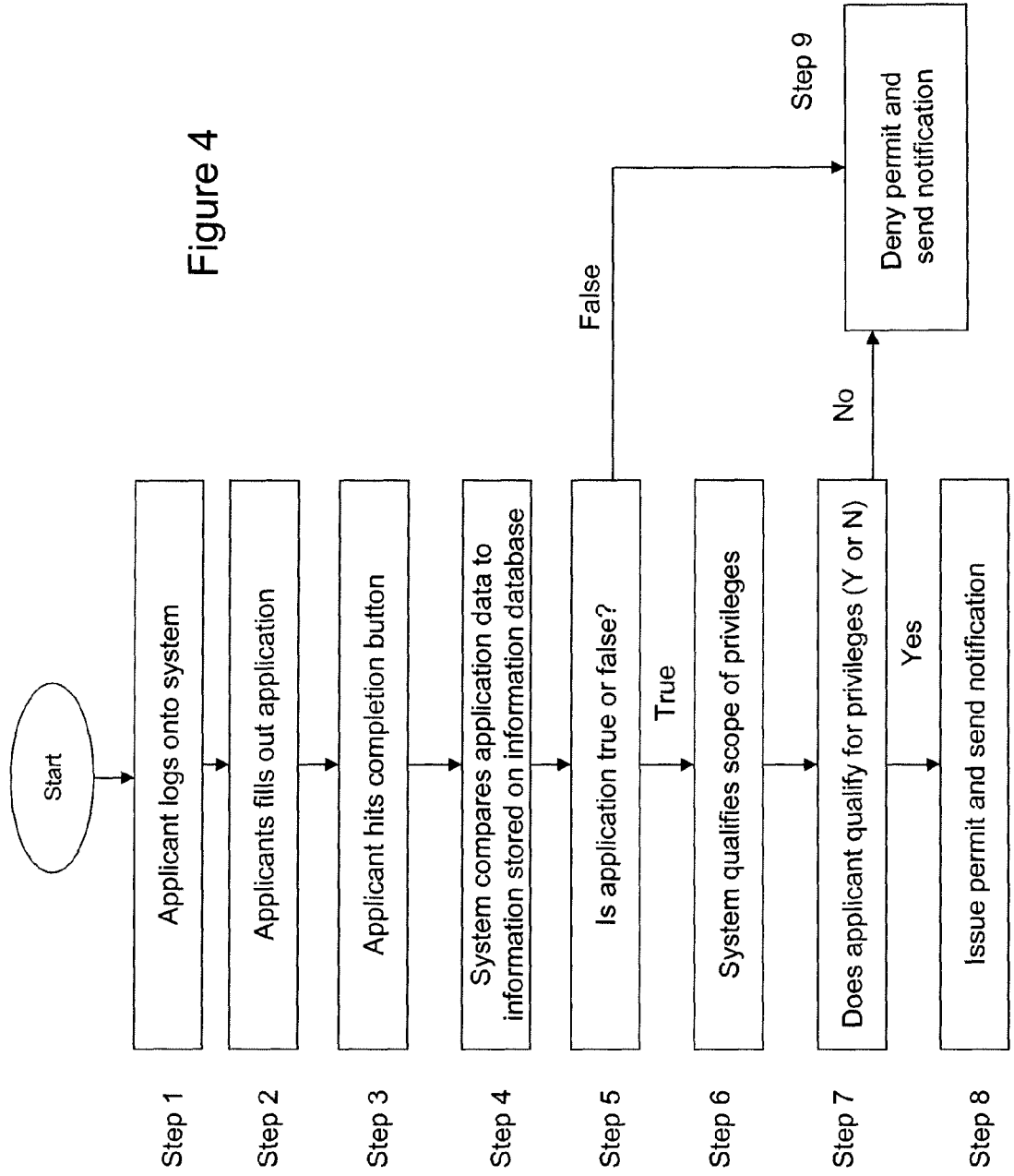
FIG. 4 is a flow chart for a new application process for the disclosed technology.

FIG. 4 shows a flow chart regarding the new permit process. As described above, an applicant will access the new permit module 22 by logging onto the system mainframe 2 using a web portal (Step 1). Once on the system, the applicant will fill out a standardized form (Step 2) and once completed the applicant will inform the system that the form is completed. This may be accomplished by hitting an electronic button on the web screen informing the system that the form is ready for processing (Step 3). If the applicant is a new to the system, the system may create a new user profile and associate the applicant with an account number for administrative purposes. Once the form has been finalized by the applicant, the form will be stored in the new permit database 42 and the processing of the application will begin.

During the processing phase, the processor 40 will ensure that the information contained in the applicant is true. This is accomplished by allowing the processor 40 to compare the applicant information contained on the application with data from the information database 28 (Step 4). Information that may be verified is (1) the vehicle registration address, (2) vehicle registration validity, (3) the vehicle registration matches the vehicle owner's/permit applicant's primary address and (4) any other information that may be stored in the information database 28. The information database 28 is a database that contains information about the applicant from outside sources such as the Department of Motor Vehicles records, school enrollment systems, business databases and other similar databases. The outside source data 14 may be uploaded onto the information database 28 base on a regular schedule, e.g., daily, weekly. Or the outside source data 14 may be electronically linked to the information database 28 and the mainframe may send data requests to the outside sources 14 as needed.

In Step 5, the module determines if the application information is true or false. If the applicant information is found to be false, the permit will not be issued and the system 1 will notify the applicant as to the reasons of why the application was denied, e.g., the vehicle was not registered to the applicant or the registration has expired. (Step 9).

If the applicant information is found to be true, the system will then proceed to the next step which qualifies the scope of privileges requested by the applicant. (Step 6). The scope of privileges may include, but is not limited to: a) one or more locations, zones, streets, lots, spaces, garages, parking structures or areas the vehicle is requested to park; b) the term of the permit and/or the permit's expiration date; and/or c) the valid parking time or times (i.e., weekend-only rights; weekday-only rights, seasonal rights, etc.).

The qualification step is performed using a dynamic rules-based engine that identifies the parking rights which were applied for by the applicant and applies these rights a set of nested rules. These nested rules are a set of requirements that must be met in order for an applicant is allowed to receive these privileges. Each requirement is considered to be part of a set and each set can have one or multiple items. For eligibility, depending on the set of rules, all or some of the requirements must be met in order to obtain a permit. These rules may be evaluated recursively with a parent set until a final valid or invalid result is returned. The benefit to a rule engine as described above is that multiple levels of approvals and restrictions can be defined so that items of high importance have more weight than items of lower importance.

For example, the rules may state that an applicant must reside within a certain number of miles or blocks of the requested zone, and/or the applicant must take classes at the university, or the applicant must be employed by institutions in which the permit is for, and/or the applicant must have no outstanding debts with the entity. If the applicant does not meet one or all of these rules the applicant may be denied the permit and a notification informing the applicant of the reasons why the application will be denied will be sent to the applicant. (Step 9). If the applicant meets required nested rules (Step 7), the system will approve the permit and notify the applicant of the approval. (Step 8). In one embodiment, the notification may be sent via e-mail, text message or any other electronic notification system. In another embodiment, the notification may be mailed to an address associated with the permit.

Once approved, the system 1 will associate the vehicle license plate with the permit data and will store this data in the permit database 30. That is, the issued permits will be held in the permit database 30 that stores information pertaining to the permits. Types of information that may be stored includes, but is not limited to, 1) vehicle data (includes, but is not limited to the make, model, color, year, and/or license plate number of the vehicle or vehicles authorized under a valid permit), 2) permit holder data (includes, but is not limited to, the permit holder's name, address, phone number, e-mail address, and/or facsimile number) and/or 3) permit data (defines the scope of privileges or parking rights held by the permit holder, including, but is not limited to: a) the one or more locations, zones, streets, lots, spaces, or areas the vehicle is permitted to park; b) the term of the permit and/or the permit's expiration date; and/or c) the valid parking time or times (i.e., weekend-only rights; weekday-only rights, seasonal rights, etc.)).

Figure 5:
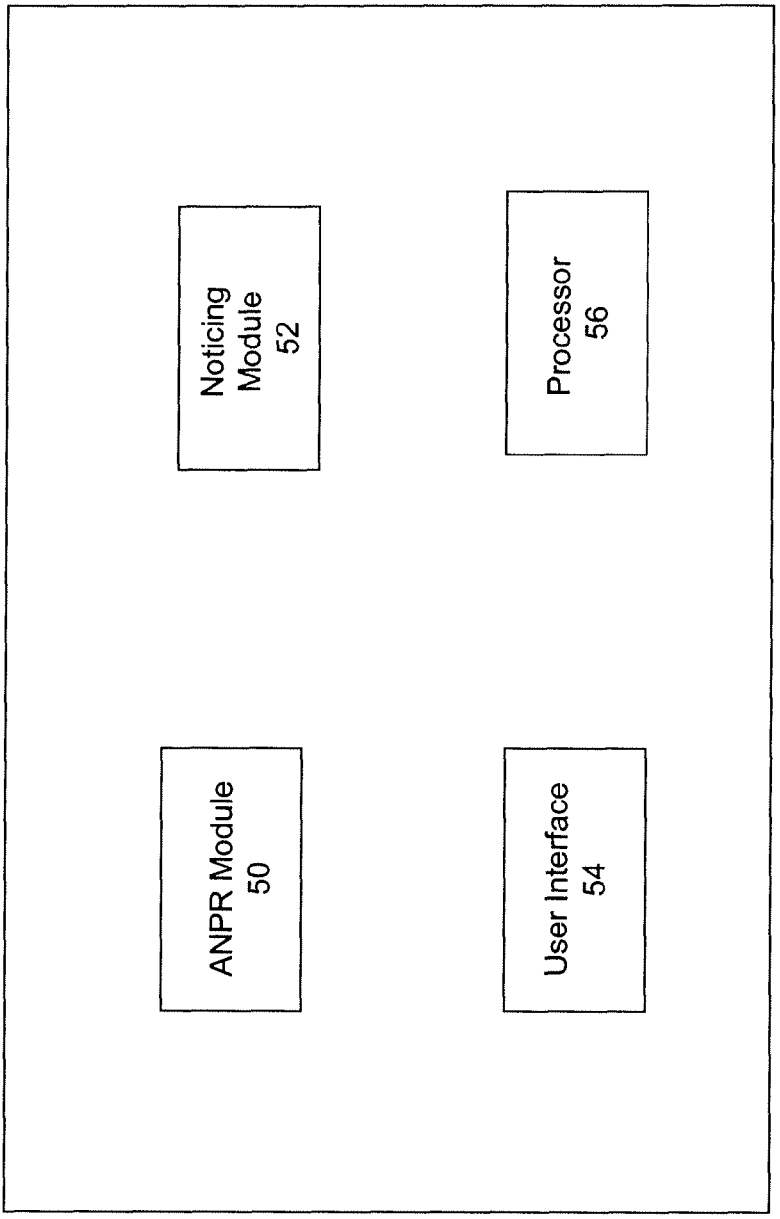
FIG. 5 is a block diagram showing an enforcement module for the disclosed technology.

FIG. 5 shows the enforcement module 24. The enforcement module 24 is an integrated, automated process where the system 1 captures all vehicles that are parked within a zone during a defined period of time. Once a zone is patrolled, the system 1, in an automated fashion, uses a rule system to segregate vehicles in violation from vehicles that are not and creates a citation based on violation type.

The enforcement module 24 includes, but is not limited to, a user interface 54, a full or partial Automatic Plate Number Recognition (ANPR system) 50, a noticing module 52, and processor 56. The user interface 54 allows the system to receive and transmit data from and to the system mainframe 1.

Figure 6:
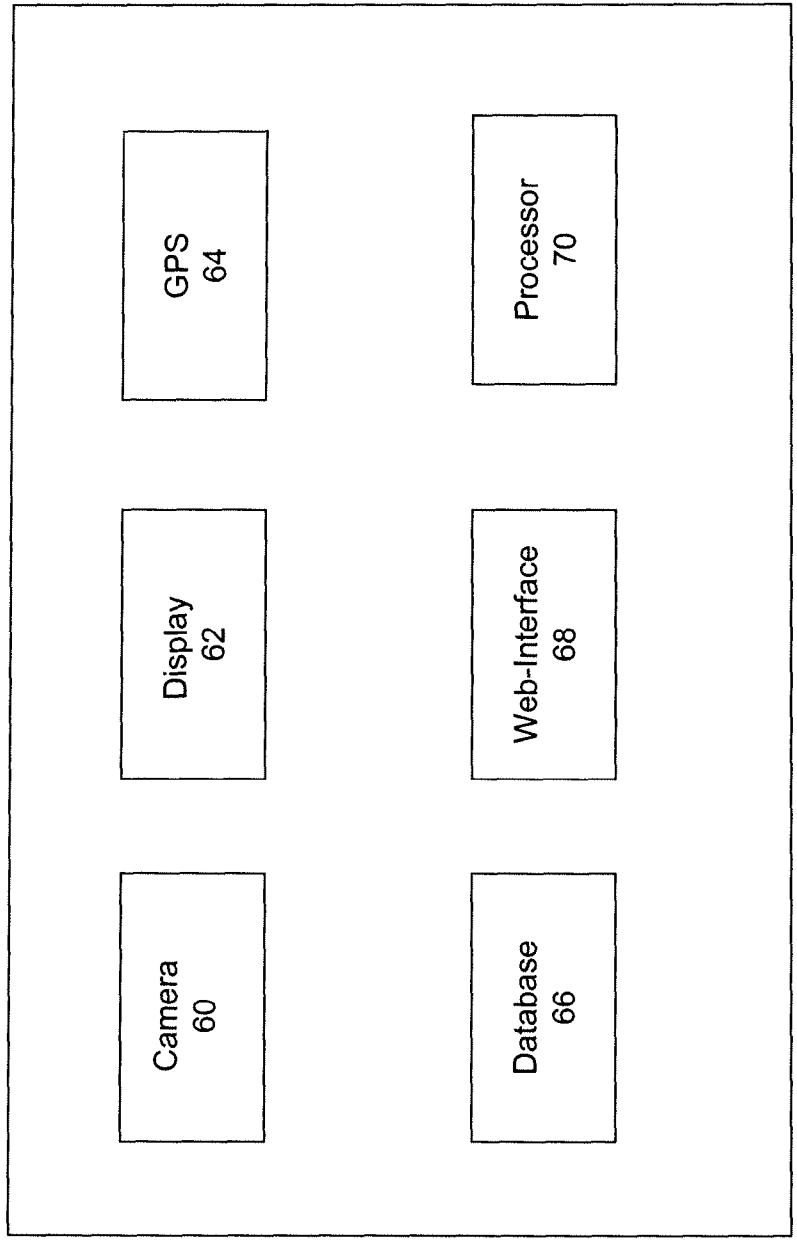
FIG. 6 is a block diagram showing an enforcement computing system for the disclosed technology.

As shown in FIG. 6, the enforcement computing system 6 is part of an ALPR system that includes, is not limited to, a camera 60, a web-interface 68, GPS 64, display 62, database 66, a processor containing a full or particle ANPR system 70. The camera 60 may be affixed to an outside of an enforcement vehicle or a handheld camera operated by an enforcement officer. The camera 60 is configured to record vehicle identifiers while in motion, e.g., license plates and permit tags, and send the images to a processor for optical recognition.

For background, an ANPR system may use a series of image manipulation techniques to detect, normalize and enhance images of licenses plates, and then use optical character recognition (OCR) to extract the alphanumerics of the license plate. ANPR systems are generally deployed in one of two basic approaches: one allows for the entire process to be performed at the time an image is captured in real-time, and the other transmits the images to a remote computer location where the OCR process is done off-site at a later time.

Problems that arise when using these systems is image quality. For example, relative speed of the camera may affect the camera's ability to accurately read a license plate as well as time of day, weather and angles between the cameras and the license plates. A system's illumination wavelengths can also have a direct impact on the resolution and accuracy of a read in these conditions. Therefore, ALPR algorithms must be adjusted to compensate for these variables.

Also when installing ANPR cameras on law enforcement vehicles careful consideration is needed so that a proper balance between the positioning of the camera angle to the positioning of the license plates can be reached. Using the right number of cameras and positioning them accurately for optimal results can prove challenging, given the various missions and environments at hand. In a preferred embodiment, the cameras will be installed in multiple positions on an enforcement vehicle so that the camera can get good quality images when (1) the enforcement vehicle is being driven at a moderate speed (e.g., 5-25 mph), (2) a variety of zones are being patrolled (e.g., streets, lots, angled parking) and (3) the license plates to be analyzed are from multiple states (e.g., New York, New Jersey, etc.).

Figure 7:
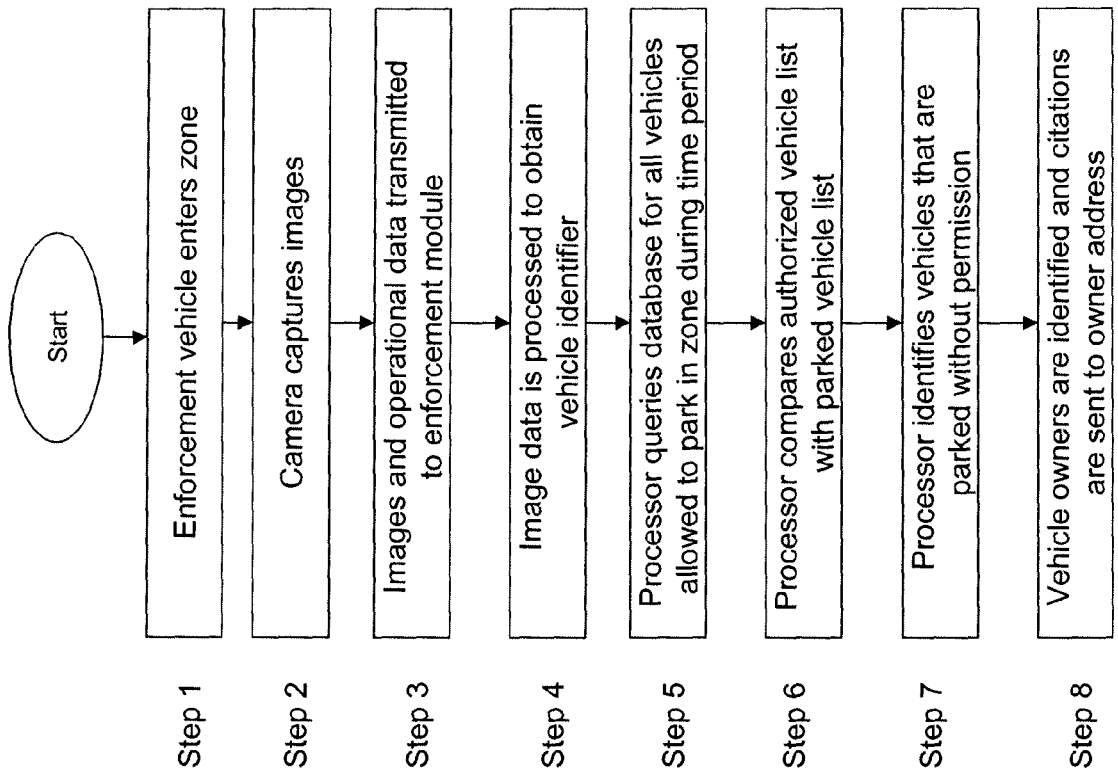
FIG. 7 is a flow chart for a enforcement process for the disclosed technology.

FIG. 7 illustrates an exemplary process flow for monitoring a permit-based parking environment to determine if the vehicle(s) parked therein are permissibly parked. In step 1, an enforcement vehicle enters a parking zone during a defined period of time. In Step S2, an ALPR camera 8 captures images of vehicles parked in a permit-based parking zone managed by the parking permit system 1. The enforcement vehicle may have a GPS system that tracks the location of the enforcement vehicle to ensure that the enforcement vehicle is within the zone where enforcement is to be verified. In another embodiment, a map may be shown on the display that allows the operator to know the boundaries of zone in which the enforcement vehicle is operating.

In step S3, the enforcement computing system transmits image data and operational data to the enforcement module 24. The operational data may include the zone being patrolled, a time and a date and a geographic location of the vehicle, e.g., the geographic location may be a GPS coordinate or a point on a display map. In step 4, the image is processed using the ALPR module to obtain a vehicle identifier, e.g. a license plate. (In another embodiment, the image may be processed in real-time by the enforcement computing system 6 and then transmits the vehicle identifier to the enforcement module 24.

In step 5, the processor queries the permit database 30 to identify all cars that are authorized to park in the zone during a specified time period. In Step 6, the vehicle identifiers parked in the lot are compared to the list containing all the cars that are authorized to park in the zone during the specified time period. Step 7, the module 24 identifies vehicles that are parked within the zone without permission. In Step 8, the module 24 then looks up vehicle owner information using the information database 28 to find the owner information and then issues an enforcement action to the vehicle owner, e.g., a citation may be sent to an individual whose car was parked in the lot on Saturday when the permit was only issued for weekdays between 9 AM and 2 PM. The vehicle owner may be notified by mail or some other type of notification method such as e-mail. It is worthy to note that an enforcement officer does not have to place a citation on the windshield or any other area of the vehicle. During the enforcement stage, offenders may also be identified if vehicle has an expired registration or the offender has outstanding tickets.

Additionally, if a vehicle identifier cannot be associated with any individual or entity within the information database, the captured image may be sent to the administrative computing system where an operator may review the captured image to see if a vehicle identifier can be found and, if so, was the car in violation.

Figure 8:
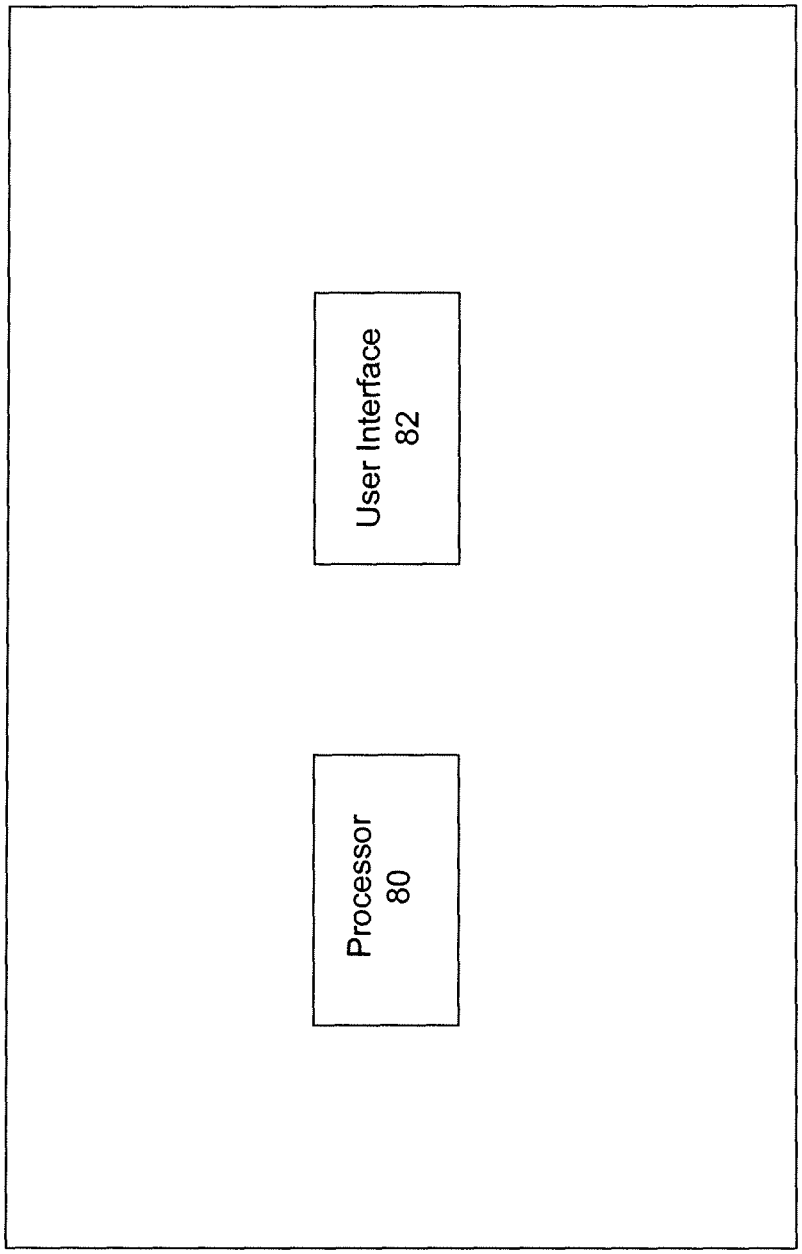
FIG. 8 is a block diagram showing a report generator module for the disclosed technology.

As shown in FIG. 8, the parking permit system 1 also includes the report generator module 26 that includes, but is not limited to, a processor 80 and user interface 82. This module 26 aggregates data and presents the data in a format that can be easily disseminated to public figures and the general public to show the progress of existing programs and the effectiveness of implementing programs in new places. The information may be disseminated via e-mail, mail notifications and web-based visualizations such as a heat map. It can also be used to identify repeat offenders and send these offenders statistics on the parking program, the cost and how the repeat offender would be better suited to join the program.

The report generator 26 is a computer-executable module configured to generate reports relating to the parking program. One having ordinary skill in the art will appreciate that a variety of reports may be generated by the report generator. The reports may include any information related to the parking program which is maintained by the parking permit system. For example, reports which may be generated include, but are not limited to, reports relating to: 1) financial information (e.g., receivables of the parking program, 2) enforcement officer performance information (e.g., number of scans, number of warning/notices, number of citations, number of times the enforcement officer failed to take action, etc.), 3) permit holder account information, 4) permit inventory, 5) enforcement action information and any other reporting material that is relevant to the parking system.

Another aspect of the report generator 26 is generating a report showing how a zone not under a permit system will benefit if a system is applied. That is, the report generator 26 may be used to create suggestions for new zones or inform municipalities about permit options in zones that are not under a permit management system 1.

The report generator may also have an algorithm that analyzes the data so that suggestions for changes to rules for parking optimization.

The report generator is also capable of forming a list of permits set to expire within a timeframe so that the system may send out notifications to the permit holder so that there are no gaps in permit coverage.

One example for a process of the report generator 26 is shown in FIG. 9. Here, an administrator provides the report generator 26 with proposed boundary lines for a new zone. (Step 1). This may be performed by overlaying a map with a proposed zone or defining the zone using street and avenues.

The report generator 26 may then compare the proposed zone to existing zones so that a similar zone may be found. (Step 2). Once a similar zone is found, the system will analyze the proposed zone. (Step 3). Once analyzed, the module 26 may generate a report showing an approximation of (1) how many parking permits may be issued for the proposed zone, (2) how many spots may be created within the proposed zone, (3) the projected revenue for the proposed zone and (4) the amount of applicants that are qualified to have a permit.

Another aspect also allows the generator to form a list of repeat offenders within a zone and analyze the offender information to see if the offender is eligible to park with a zone or a nearby zone and what would the cost of such permit be.

The report generator may also allow particular users groups (e.g., permit holders, applicants, administrators, etc.) to submit a request for a report via the user interface. Based on the report request, the report generator can retrieve information from the database, generate the report, and provide the report to the requesting user group via the user interface.

The report generator may also be configured to automatically run reports at one or more specific intervals of time (e.g., hourly, daily, weekly, monthly, yearly, etc.) according to a pre-determined and customizable schedule. For example, the report generator may run a daily report detailing each violation that occurred in a particular zone during the previous 24 hour period, and automatically deliver the report to a managing computer and/or the enforcement computing system associated with that zone.

The report generator may also automatically receive report requests from the enforcement computing system. For example, the enforcement computing system may send a daily request for a report providing permit data updates.

The report generator may also present the parking permit data in a usable format so that advantages and disadvantages of program can easily be seen. For example, the method may analyze the parking permit data for program advantages and disadvantages and notify permit holders and/or governing entities, such as, municipalities, universities or any other parking provider, of the advantages and disadvantages of the parking program. For example, the amount of spaces that were made available or are unused or the amount of revenue received or lost.

Another embodiment of the system allows a valid permit holder to apply for guest permits. That is, a valid permit holder may log onto system and request a temporary guest permit that is to be associated with the permit holder's account and residency. This system can be updated live but an existing account needs to be already active. A rules system may be put in place that allows guest passes to be issued. For example, a permit holder may have a limit to how many guest passes may be issued per month and the times when guest passes may not be issued.

One having ordinary skill in the art will appreciate that at least a portion of the parking permit system may include human-based components. For example, the user interface may be a call center or conventional office wherein persons (e.g., permit holders or applicants) may access the permit parking system via a telephone or in-person communication.

It is noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method for generating parking permit reports for a parking permit system comprising the steps of:
    aggregating, by a processor, parking permit data for a particular permit parking zone within the parking permit system into a logical grouping in a database;
    processing instructions for report generation by the processor;

parsing, by the processor, the data to obtain a report on enforcement actions against violators of the permit parking zone;

computing, by the processor, a change in permit fee based on the report; and distributing the report to human permit holders of the permit parking zone with notification of the change in permit fee, the report showing value of a permit for the permit parking zone and efficacy of enforcement actions against violators.

2. The computer-implemented method of claim 1 further comprises the steps of:

identifying repeat violators;

determining if the repeat violators are eligible for a parking permit within the particular zone; and notifying the repeat violators about availability and cost for a permit within the particular zone.

3. The computer-implemented method of claim 1 further comprises the steps of:

determining if zone boundaries for the particular zone are adequate for permits within the particular zone; and creating a report visualizing the determination.

4. The computer-implemented method of claim 1 further comprises the steps of:

determining rules changes within the parking zone; and notifying permit holders of the rule change.

5. The computer-implemented method of claim 1 further comprises the steps of:

determining permits set to expire within a period of time; and notifying permit holders that permits are set to expire.

6. The computer-implemented method of claim 1 wherein the data is presented in a usable format so that new permit zones may be created based on the parking permit data.

7. The computer-implemented method of claim 6 further comprises the steps of:

providing a proposed boundary for a new multi-vehicle permit parking zone;

identify an existing zone similar to the new zone by comparing the proposed zone to existing zones;

analyzing the new zone based on the existing similar zone to determine how many parking spots may be created within the new zone and how many parking permits may be issued for the new zone; and generating report showing feasibility of the new zone.

8. The computer-implemented method of claim 1 wherein the parking permit data is presented in a usable format so that advantages and disadvantages of program can easily be seen.

9. The computer-implemented method of claim 8 further comprises the steps of:

analyzing the parking permit data for program advantages and disadvantages;

notifying permit holders of the advantages and disadvantages.

10. The computer-implemented method of claim 8 further comprises the steps of:

analyzing the parking permit data for program advantages and disadvantages;

notifying governing entities of the advantages and disadvantages.

11. A system for generating parking permit reports for a parking permit system, comprising:

one or more processors;

one or more computer-readable storage mediums containing instructions configured to cause the one or more processors to perform operations including:

aggregating, by the one or more processors, parking permit data for a particular permit parking zone within the parking permit system into a logical grouping in a database;

processing instructions for report generation by the one or more processors;

parsing, by the one or more processors, the data to obtain a report on enforcement actions against violators of the permit parking zone;

computing, by the one or more processors, a change in permit fee based on the report; and distributing the report to human permit holders of the permit parking zone with notification of the change in permit fee, the report showing value of a permit for the permit parking zone and efficacy of enforcement actions against violators.

12. The system of claim 11 further comprises the steps of:

identifying repeat violators;

determining if the repeat violators are eligible for a parking permit within the particular zone; and notifying the repeat violators about availability and cost for a permit within the particular zone.

13. The system of claim 11 further comprises the steps of:

determining if zone boundaries for the particular zone are adequate for permits within the particular zone; and creating a report visualizing the determination.

14. The system of claim 11 further comprises the steps of:

determining rules changes within the parking zone; and notifying permit holders of the rule change.

15. The system of claim 11 further comprises the steps of:

determining permits set to expire within a period of time; and notifying permit holders that permits are set to expire.

16. The system of claim 11 wherein the parking permit data is presented in a usable format so that new permit zones may be created based on the parking permit data.

17. The system of claim 16 further comprises the steps of:

providing a proposed boundary for a new multi-vehicle permit parking zone;

identify an existing zone similar to the new zone by comparing the proposed zone to existing zones;

analyzing the new zone based on the existing similar zone to determine how many parking spots may be created within the new zone and how many parking permits may be issued for the new zone; and generating report showing feasibility of the new zone.

18. The system of claim 11 wherein the parking permit data is presented in a usable format so that advantages and disadvantages of program can easily be seen.

19. The system of claim 18 further comprises the steps of:

analyzing the parking permit data for program advantages and disadvantages; and notifying permit holders of the advantages and disadvantages.

20. The system of claim 18 further comprises the steps of:

analyzing the parking permit data for program advantages and disadvantages; and notifying governing entities of the advantages and disadvantages.

* * * * *